(12) United States Patent
Kajino et al.

(10) Patent No.: US 7,497,632 B2
(45) Date of Patent: Mar. 3, 2009

(54) CAMERA DEVICE

(75) Inventors: Tetsurou Kajino, Tokyo (JP); Jyouji Wada, Kanagawa (JP); Yoshihiro Fujiwara, Kanagawa (JP); Takayuki Shimaoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 581 days.

(21) Appl. No.: 11/145,242

(22) Filed: Jun. 3, 2005

(65) Prior Publication Data

US 2005/0276599 A1  Dec. 15, 2005

(30) Foreign Application Priority Data

Jun. 11, 2004  (JP)  ............... 2004-173941

(51) Int. Cl.
*G03B 17/02* (2006.01)
(52) U.S. Cl. ...................... 396/427; 348/373
(58) Field of Classification Search ............... 396/427, 396/419; 348/373–376, 143
See application file for complete search history.

(56) References Cited

U.S. PATENT DOCUMENTS

| | | | | |
|---|---|---|---|---|
| 4,414,576 | A | | 11/1983 | Randmae |
| 4,920,367 | A | * | 4/1990 | Pagano ................ 396/427 |
| 5,689,304 | A | | 11/1997 | Jones et al. ............ 348/373 |
| 6,061,087 | A | * | 5/2000 | Schieltz et al. ......... 348/151 |
| 6,354,749 | B1 | * | 3/2002 | Pfaffenberger, II ...... 396/427 |
| 6,643,456 | B1 | * | 11/2003 | Ryan et al. ............. 396/25 |
| 2003/0194230 | A1 | * | 10/2003 | Tamura ................ 396/427 |
| 2003/0231881 | A1 | * | 12/2003 | Hering et al. .......... 396/427 |
| 2004/0057717 | A1 | * | 3/2004 | Arbuckle et al. ........ 396/427 |

FOREIGN PATENT DOCUMENTS

| | | |
|---|---|---|
| EP | 0 436 797 A2 | 7/1991 |
| EP | 1 507 263 A2 | 2/2005 |
| JP | 7-281291 | 10/1995 |
| JP | 10-285454 | 10/1998 |
| JP | 2963719 | 8/1999 |
| JP | 2003-255456 | 9/2003 |
| WO | WO 2004/047421 A2 | 6/2004 |

OTHER PUBLICATIONS

Chinese Office action.

* cited by examiner

*Primary Examiner*—W. B. Perkey
*Assistant Examiner*—Fang-Chi Chang
(74) *Attorney, Agent, or Firm*—Pearne & Gordon LLP

(57) ABSTRACT

A camera is covered with a camera housing. The camera and the camera housing form a shooting window portion of a double structure having a clearance. A blowing tunnel communicated with the clearance of the shooting window portion is arranged on each of both sides of the shooting window portion. A blower sends a wind to the shooting window portion through the blowing tunnel. Further, a heater for heating the air sent to the shooting window portion is arranged in the blowing tunnel. Thus, dew condensation preventing ability can be improved by such a construction.

10 Claims, 8 Drawing Sheets

SECTION A-A

SECTION B-B

SECTION C-C

SECTION D-D

CAMERA DEVICE

BACKGROUND OF THE INVENTION

1. Field of the Invention

The present invention relates to a camera device covering a camera with a housing, and particularly relates to a camera device able to prevent dew condensation.

2. Background

In the conventional camera device such as a monitor camera for the outdoors, etc., the dew condensation is generated by the difference between the temperature of an external environment and a camera interior temperature. The temperature of the camera interior is influenced by generated heat of an electronic circuit of the camera, etc. It is required that such dew condensation is prevented. The field of view can be preferably held by the prevention of the dew condensation.

In the conventional camera device, a blower and a heater are arranged within the housing, and a warm wind is sent to a shooting window portion to prevent the dew condensation. In another conventional technique, it is proposed that an optical glass and a filter of a double structure are arranged in the shooting window portion, and nitrogen gas is sealed between a clearance between the optical glass and the filter, or the clearance between both the optical glass and the filter is set to a vacuum. Such a technique is disclosed in JP-A-10-285454 (third page and FIG. 4).

However, in the conventional camera device, dew condensation preventing ability is low since only the blower and the heater are used. It is necessary to arrange comparatively large-sized blower and heater so as to obtain a sufficient dew condensation preventing effect. Further, when the nitrogen gas is sealed in the clearance between the optical glass and the filter or the clearance is set to a vacuum, it is not easy to hold the clearance portion in a seal state. Therefore, it is not easy to obtain high dew condensation preventing ability.

SUMMARY OF THE INVENTION

The present invention is made under the above background, and an object of the present invention is to provide a camera device able to improve the dew condensation preventing ability.

The camera device of the present invention comprises a camera, a camera housing for covering the camera, and a blowing section, wherein the camera and the camera housing form a shooting window portion of a double structure having a clearance, and a blowing tunnel communicated with the clearance of the shooting window portion is arranged on each of both sides of the shooting window portion, and the blowing section sends a wind to the shooting window portion through the blowing tunnel.

Another mode of the present invention is a camera housing constructed so as to cover a camera. This camera housing comprises a window member of the camera housing side for forming a shooting window portion of a double structure having a clearance together with the camera; a tunnel wall portion for forming a blowing tunnel communicated with the clearance of the shooting window portion on each of both sides of the shooting window portion; and a blowing section for sending a wind to the shooting window portion through the blowing tunnel.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

DETAILED DESCRIPTION

Figure 1:
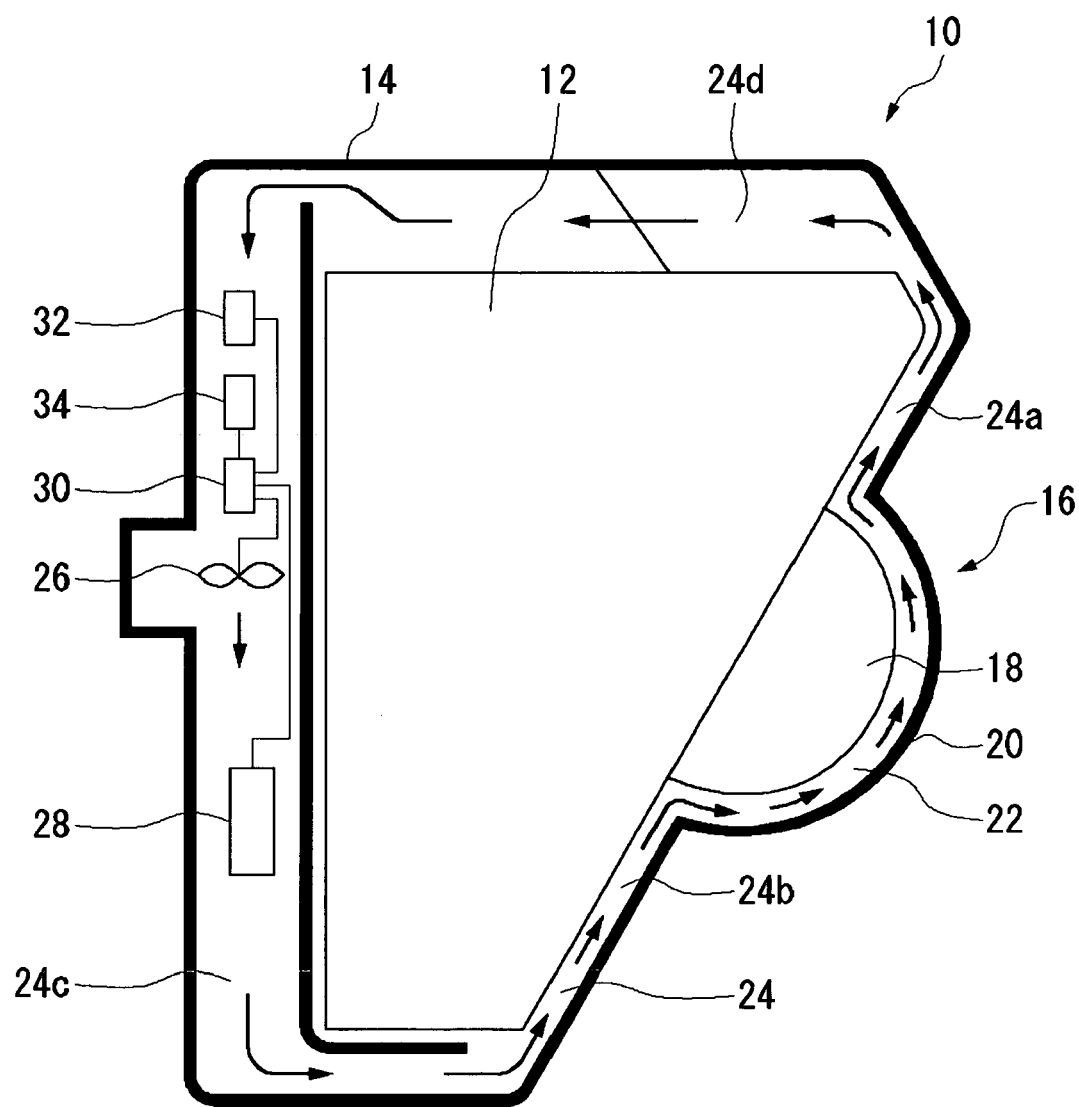
FIG. 1 is a cross-sectional view showing a camera device in an embodiment mode of the present invention.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

This camera device comprises a camera, a camera housing for covering the camera, and a blowing section, wherein the camera and the camera housing form a shooting window portion (or a photographing window portion) of a double structure having a clearance, and a blowing tunnel communicated with the clearance of the shooting window portion is arranged on each of both sides of the shooting window portion, and the blowing section sends a wind to the shooting window portion through the blowing tunnel.

In accordance with this construction, since the shooting window portion is set to the double structure and the wind is sent to the clearance of the double structure via the blowing tunnel, dew condensation preventing ability is obtained by a heat insulating effect of the double structure and the effect of a flow of the air using the blowing. Further, since the air is supplied by passing through a narrow space by sending the wind via the blowing tunnel, the flow velocity of the air of the shooting window portion is increased so that the dew condensation preventing ability can be improved.

In this camera device, the blowing tunnel may be formed by the outer face of the camera and the inner face of the camera housing. In accordance with this construction, the blowing tunnel can be carried out by a simple construction.

Further, in this camera device, the blowing tunnel may be arranged so as to form a blowing path turning round the circumference of the camera. In accordance with this construction, the air sent from the blowing section is reliably sent to the shooting window portion. High dew condensation preventing ability is obtained even when the blowing section is separated from the shooting window portion. Accordingly, the degree of freedom of position setting of the blowing section is increased. Further, the dew condensation preventing ability can be also improved by circulating the air by using a blowing path.

Further, this camera device may comprise a heater for heating the air supplied to the shooting window portion. In accordance with this construction, a warm wind can be sent to the shooting window portion. The dew condensation preventing ability can be further improved by the heating effect of the warm wind.

Further, this camera device may comprise a temperature detecting section, and a control section for controlling the operations of the blowing section and the heater in accordance with temperature detected by the temperature detecting section. In accordance with this construction, electric power consumption is restrained by controlling the operations of the blowing section and the heater.

Further, in this camera device, the camera and the camera housing may have a double dome cover in the shooting window portion. In accordance with this construction, the dew condensation of the dome cover in the camera device with the dome cover can be prevented.

In another aspect, a camera housing constructed so as to cover a camera is provided. This camera housing comprises a window member of the housing side for forming a shooting window portion of a double structure having a clearance together with the camera; a tunnel wall portion for forming a blowing tunnel communicated with the clearance of the shooting window portion on each of both sides of the shooting window portion; and a blowing section for sending a wind to the shooting window portion through the blowing tunnel. The above advantages can be also obtained by this construction.

As mentioned above, in the camera device and its housing of the present invention, the shooting window portion is set to the double structure and the wind is sent to the clearance of the double structure via the blowing tunnel. Thus, since the air is supplied by passing through a narrow space, the flow velocity of the air of the shooting window portion is increased and the dew condensation preventing ability can be improved.

The camera device of an embodiment mode will next be explained by using the drawings.

FIG. 1 shows a cross-sectional view of the camera device of the embodiment mode. In FIG. 1, the camera device 10 has a camera 12 and a camera housing 14. The camera 12 is stored into the camera housing 14.

The camera 12 shoots or photographs a subject through a shooting or photographing window portion 16. The camera 12 has a dome cover 18 of the camera side (inside) in the shooting window portion 16. The camera housing 14 has a dome cover 20 of the housing side (outside) in the shooting window portion 16. The two dome covers 18 and 20 are overlying each other. A clearance 22 is made between the dome cover 18 and the dome cover 20. Thus, the shooting window portion 16 has a double structure.

A blowing tunnel 24 is arranged on each of both sides of the shooting window portion 16 so as to communicate with the clearance 22 of the shooting window portion 16. The blowing tunnel 24 is formed by the outer face of the camera 12 and the inner face of the camera housing 14. The blowing tunnel 24 has front face portions 24a, 24b, a rear face portion 24c and an upper face portion 24d, and these portions are communicated with each other. Thus, the blowing tunnel 24 is arranged so as to surround the circumference of the camera 12, and a blowing path turning round the camera 12 is formed. The front face portions 24a, 24b are respectively upper and lower portions with the dome covers of the shooting window portion 16 sandwiched therebetween.

A blower 26 and a heater 28 are arranged within the blowing tunnel 24. The blower 26 and the heater 28 are arranged on the rear face side of the camera 12. Further, a control circuit 30 for controlling the operations of the blower 26 and the heater 28 is arranged. The control circuit 30 is connected to a temperature sensor 32 and an electric power source device 34.

The control circuit 30 controls the supply of electric power from the electric power source device 34 to the blower 26 and the heater 28 on the basis of temperature detected by the temperature sensor 32. Thus, the control circuit 30 controls turning-on and turning-off of the blower 26 and the heater 28. When the blower 26 is rotated by turning-on the blower 26, the air is sent from the blowing tunnel 24 to the shooting window portion 16. At this time, the air is heated by turning-on the heater 28 and a warm wind is sent.

The camera device 10 of this embodiment mode will next be further explained with reference to the detailed drawings.

Figure 2:
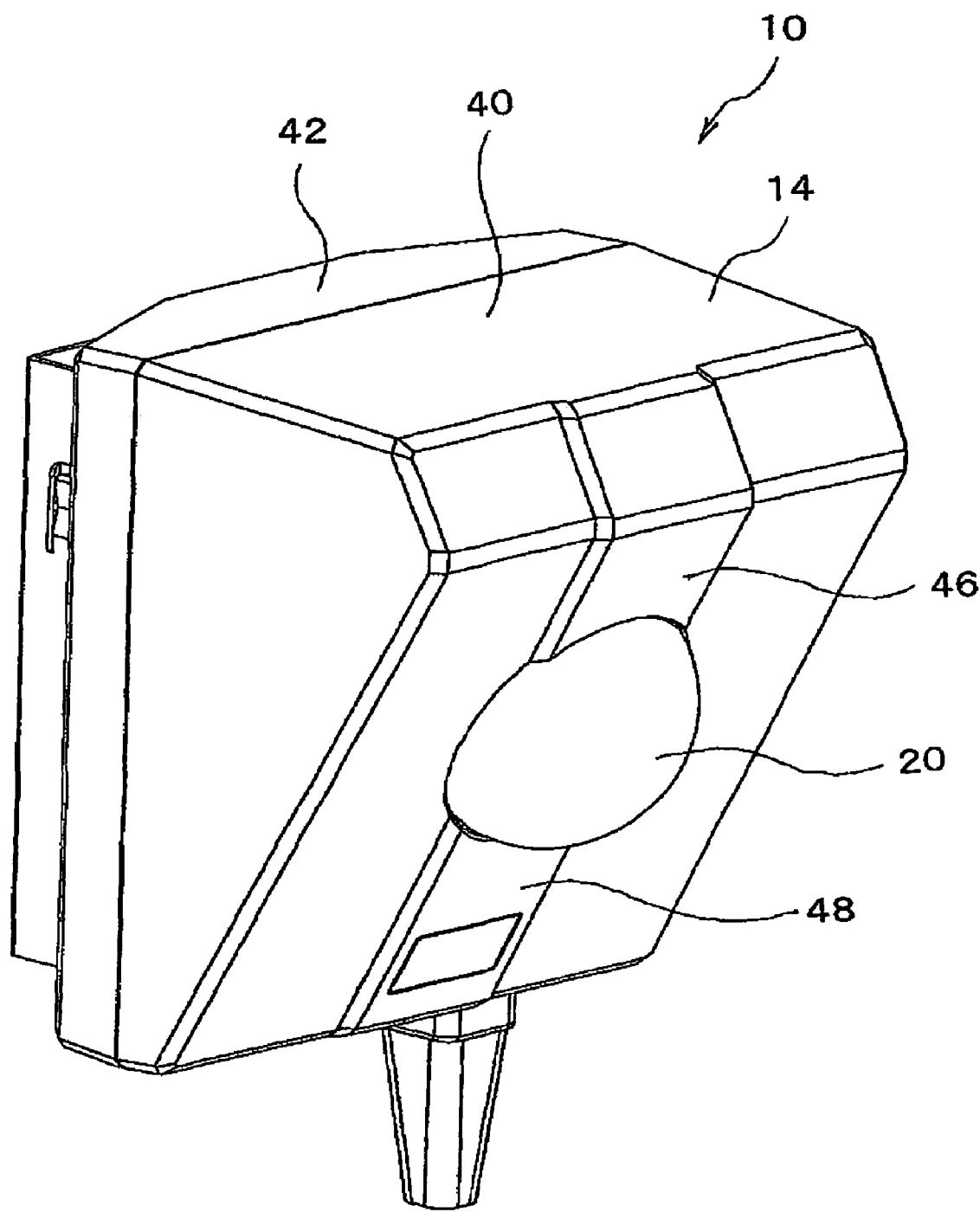
FIG. 2 is a perspective view of the external appearance of the camera device.
Figure 3:
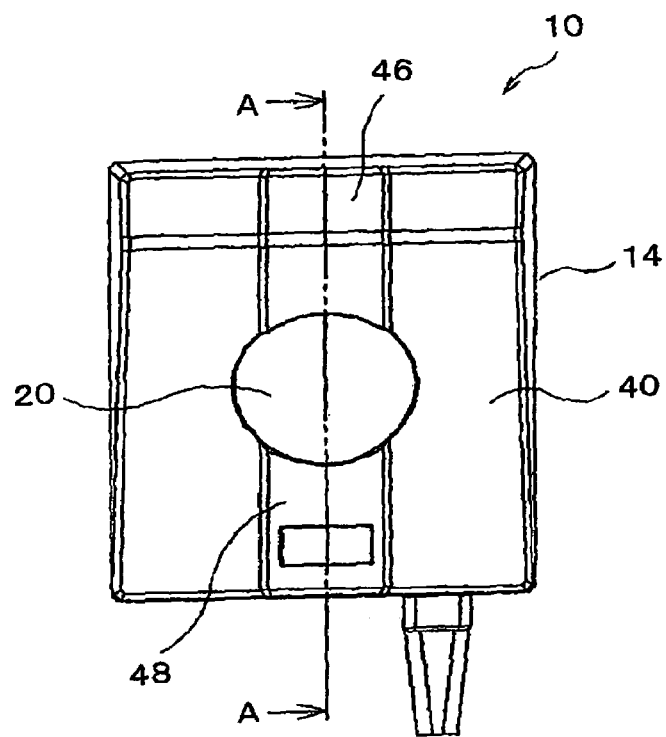
FIG. 3 is a front view of the external appearance of the camera device.
Figure 4:
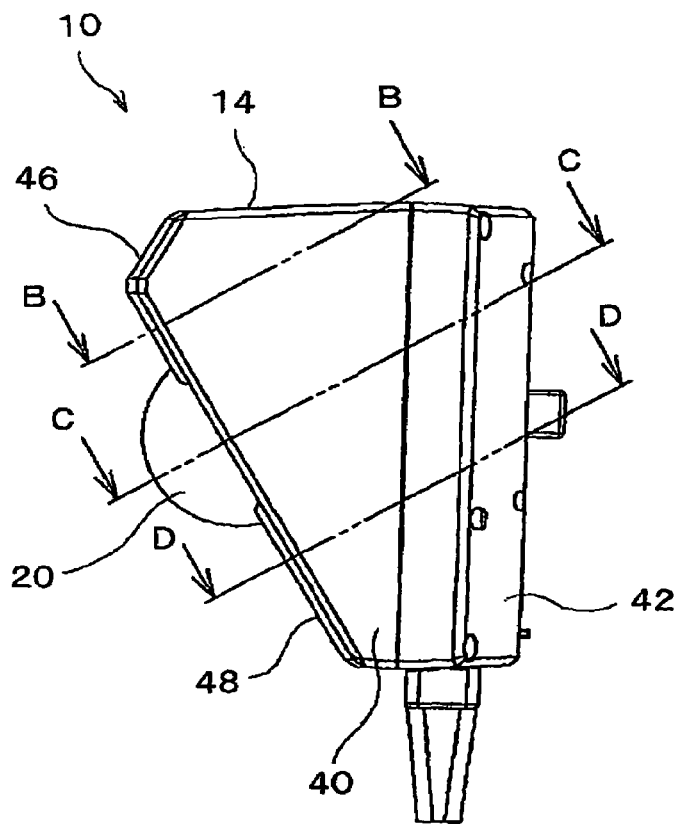
FIG. 4 is a side view of the external appearance of the camera device.
Figure 5:
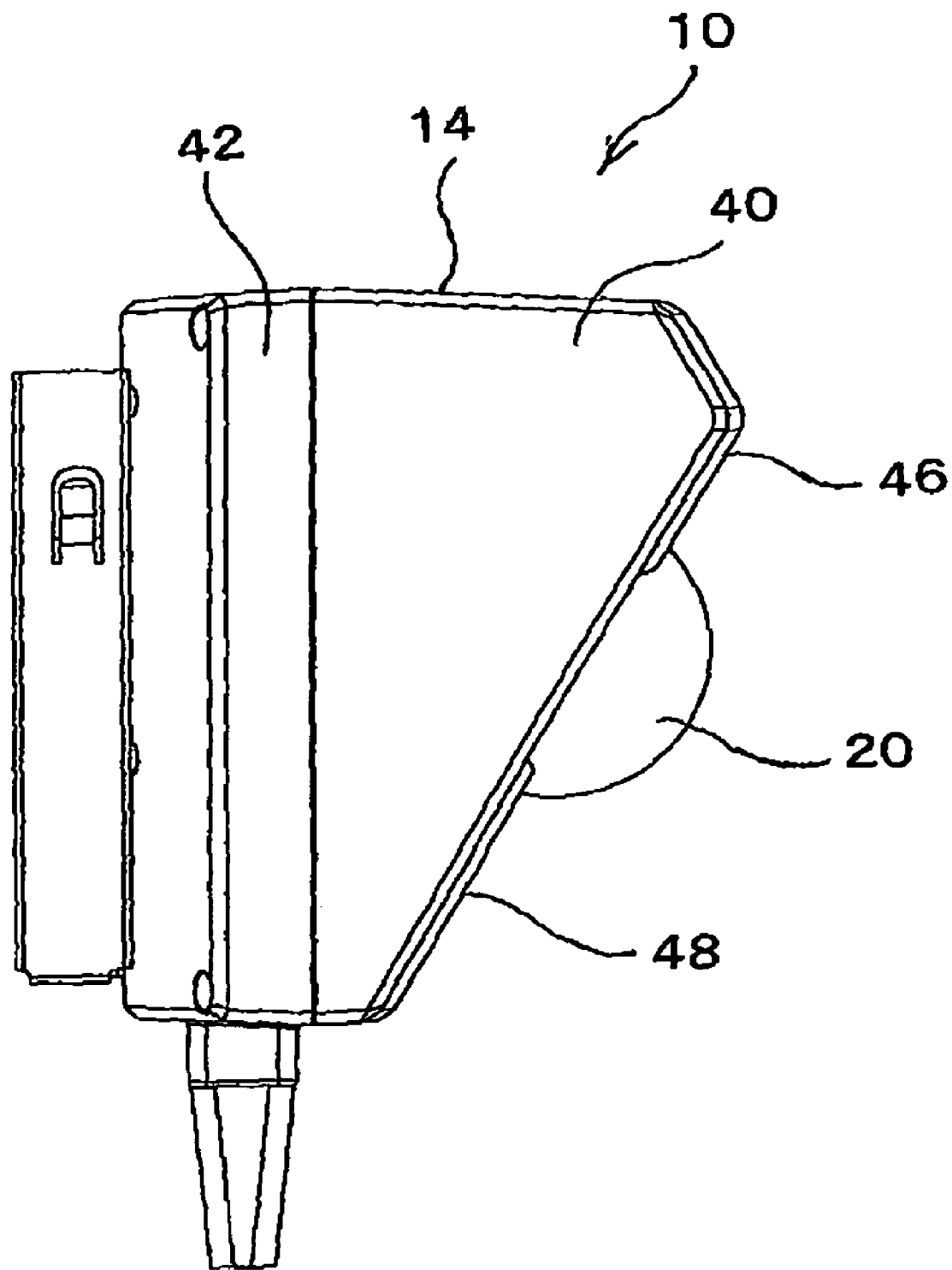
FIG. 5 is a side view of the external appearance of the camera device.
Figure 6:
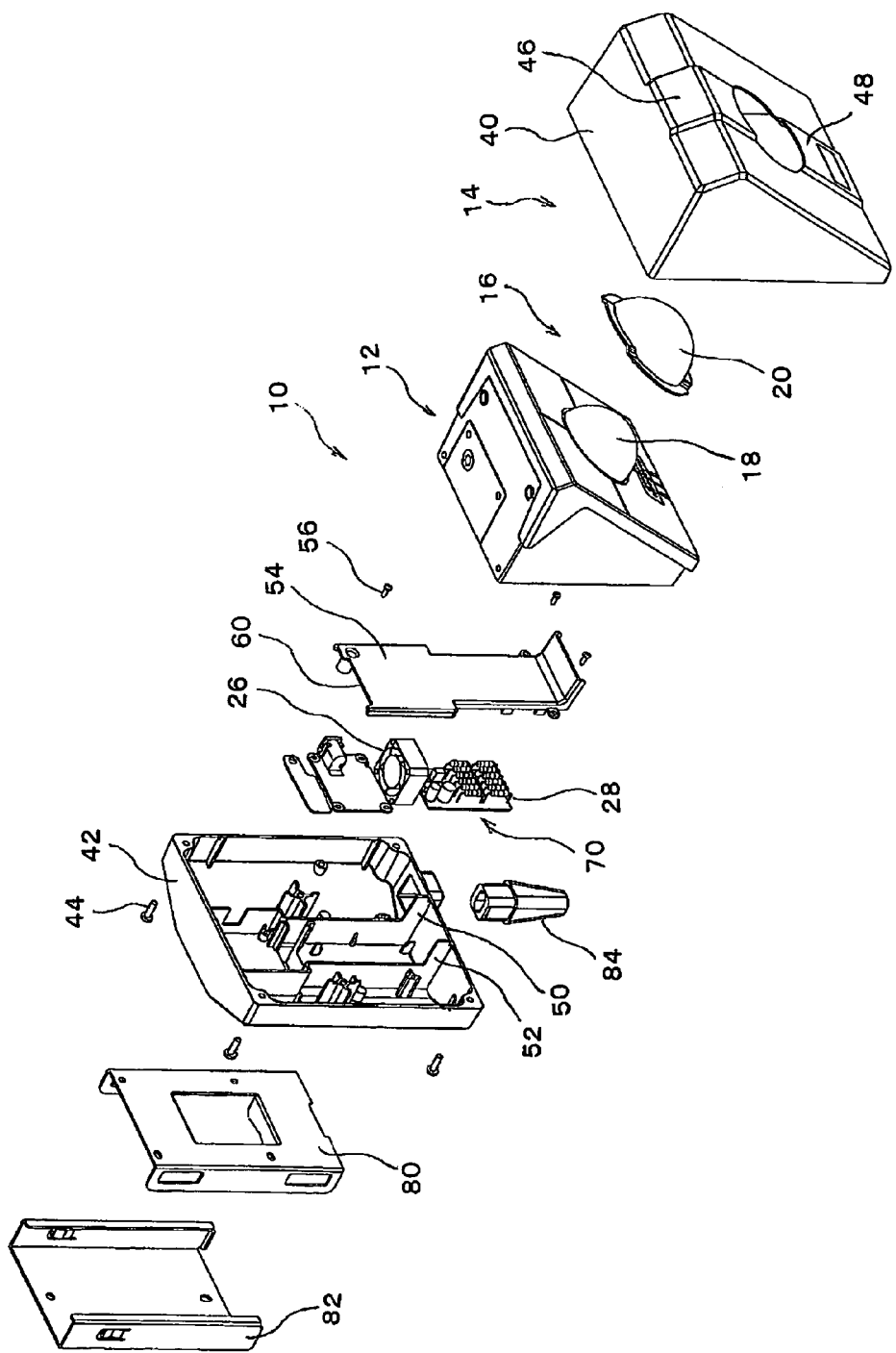
FIG. 6 is an exploded perspective view of the camera device.
Figure 7:
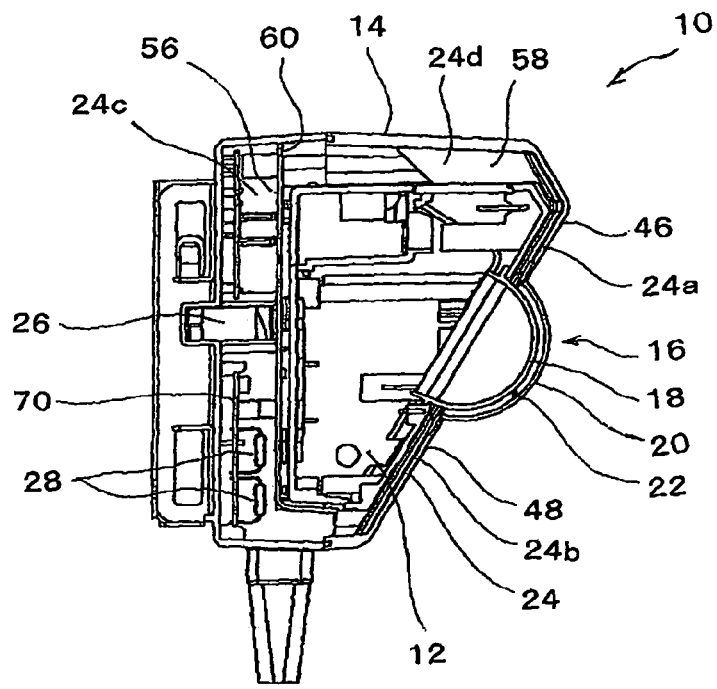
FIG. 7 is a cross-sectional view of the camera device.
Figure 8:
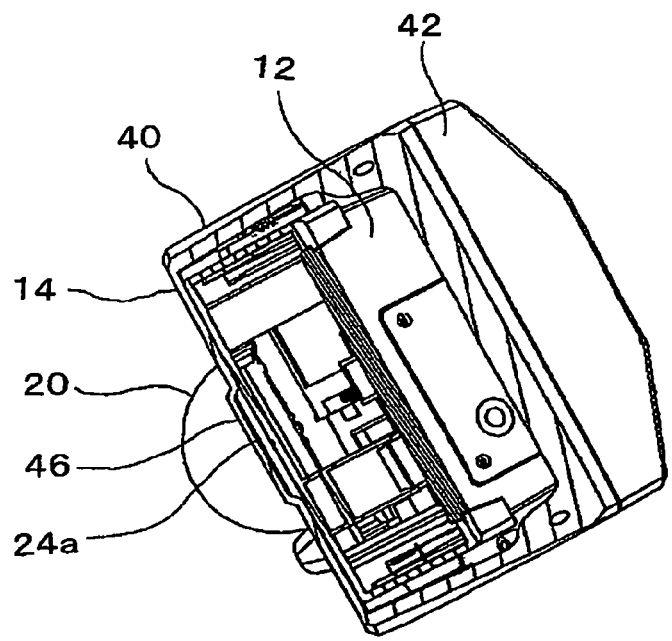
FIG. 8 is a cross-sectional view of the camera device.
Figure 9:
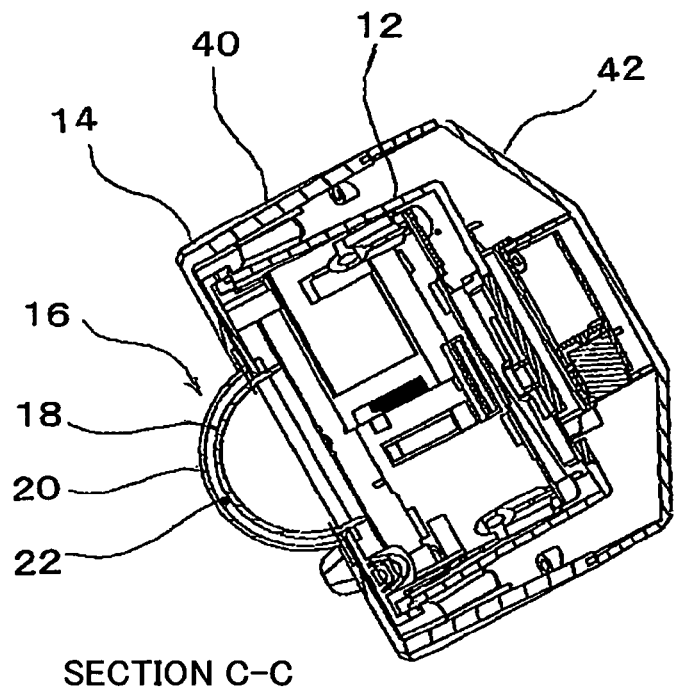
FIG. 9 is a cross-sectional view of the camera device.
Figure 10:
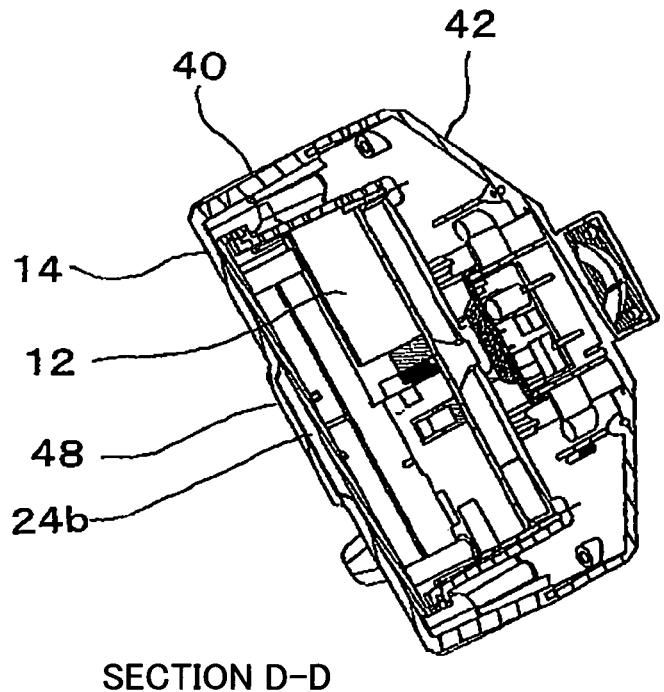
FIG. 10 is a cross-sectional view of the camera device.

FIGS. 2 to 5 show the external appearance of the camera device 10. FIG. 2 is a perspective view of this external appearance, and FIG. 3 is a front view of this external appearance. FIGS. 4 and 5 are side views of this external appearance. FIG. 6 is an exploded perspective view of the camera device. FIG. 7 is a cross-sectional view in which the camera device 10 is cut along a longitudinal line A-A passing a dome center of FIG. 3. FIGS. 8, 9 and 10 are cross-sectional views cut along lines B-B, C-C and D-D in FIG. 4. The line C-C is a line passing the dome center and directed to be perpendicular to the camera front face. The lines B-B and D-D are parallel lines on both sides of the line C-C.

As already explained, the camera 12 is stored into the camera housing 14 in the camera device 10. The camera 12 is a monitor camera. The camera housing 14 is a housing for the outdoors.

As shown in FIG. 6, the camera 12 is approximately formed in a triangular prism shape. Three side faces of the approximately triangular prism correspond to the front face, the upper face and the rear face of the camera 12. The camera 12 has the dome cover 18 of a hemispherical type at the center of the front face. The dome cover 18 is manufactured by transparent resin. A camera lens and a pan-tilt mechanism are stored into the dome cover 18.

The camera housing 14 has a two-divisional structure, and is constructed by a front housing 40 and a rear housing 42. The front housing 40 and the rear housing 42 are fixed by screws 44 in a state where the camera 12 is nipped therebetween.

The dome cover 20 is attached to the front face of the camera housing 14. The dome cover 20 is manufactured by transparent resin. The dome cover 20 is fixedly attached to the front housing 40 by ultrasonic welding so that water-proof property is secured. As shown in FIGS. 7 and 9, the clearance 22 is arranged between the dome cover 20 and the dome cover 18.

As shown in FIG. 2, the camera housing 14 has tunnel wall portions 46, 48 on both the upper and lower sides of the dome cover 20. The tunnel wall portions 46, 48 are portions in which the camera housing 14 is projected outside. In the tunnel wall portions 46, 48, a concave portion is arranged on the inner face of the camera housing 14. The concave portion and the outer face of the camera 12 form the front face portions of the blowing tunnel 24.

As shown in FIGS. 7, 8 and 10, both the left and right sides of the tunnel wall portions 46, 48 of the camera housing 14 are close to the outer face of the camera 12. Thus, by the concave portions of the tunnel wall portions 46, 48 and the outer face of the camera 12, an air passage is formed, and the front face portions 24a, 24b of the blowing tunnel 24 are formed. The front face portions 24*a*, 24*b* are respectively upper and lower side tunnel portions of the dome cover. The front face portions 24*a*, 24*b* of the blowing tunnel 24 are respectively communicated with the upper and lower ends of the clearance 22 between the dome cover 20 and the dome cover 18.

The depths of the concave portions of the blowing tunnel wall portions 46 and 48 are set to be approximately equal to the distance of the clearance 22 between the dome cover 20 and the dome cover 18. The widths of the concave portions of the tunnel wall portions 46 and 48 are set to be approximately equal to the diameter of the dome cover 18 of the camera side. Accordingly, the sectional shape of the blowing path in the front face portions 24*a*, 24*b* is set to a thin and wide shape so as to correspond to the clearance 22 between the dome cover 20 and the dome cover 18. Thus, an air flow is efficiently supplied to the entire clearance 22 of the shooting window portion 16.

Next, the construction of the rear face portion 24*c* of the blowing tunnel 24 will be explained. As shown in FIG. 6, two longitudinal tunnel wall ribs 50, 52 are arranged on the inner face of the camera housing 14 on the camera rear face side. The tunnel wall ribs 50, 52 are arranged so as to be spaced from each other in the transversal direction. A tunnel wall plate 54 is attached to the rear housing 42 by screws 56 in a state where it comes in contact with the two tunnel wall ribs 50, 52. Thus, the rear face portion 24*c* of the blowing tunnel 24 is formed between the inner face of the rear housing 42, the two tunnel wall ribs 50, 52, and the tunnel wall plate 54.

Next, the construction of the upper face portion 24*d* of the blowing tunnel 24 will be explained. With reference to FIG. 7, two tunnel wall ribs 58 are arranged inside an upper face portion of the front housing 40. The two tunnel wall ribs 58 are arranged so as to be spaced from each other in the transversal direction. The tunnel wall rib 58 is close to the upper face of the camera 12. Thus, the upper face portion 24*d* of the blowing tunnel 24 is formed between the inner face of the front housing 40, the two tunnel wall ribs 58, and the upper face of the camera 12. The two tunnel wall ribs 58 are started from the front end of the upper face and are terminated in an intermediate portion of the upper face. Accordingly, the upper face portion 24*d* of the blowing tunnel 24 is also terminated in the intermediate portion of the upper face.

In the above blowing tunnel 24, the lower end of the rear face portion 24*c* is bent forward and is communicated with the lower end of the front face portion 24*b*. The upper end of the front face portion 24*a* is communicated with the upper face portion 24*d*. Thus, the blowing tunnel 24 is started from the upper end of the rear face, and is lowered downward and is turned round the camera lower end and is raised on the lower side of the camera front face, and passes through a dome portion and reaches the upper end of the upper side of the front face and further reaches an intermediate portion of the upper face.

Further, a suction port 60 of the air is arranged at the upper end (blowing tunnel starting point) of the tunnel wall plate 54 of the rear face side. The suction port 60 is constructed by the clearance between the upper end of the tunnel wall plate 54 and the inner face of the housing. The suction port 60 is opposed to a tunnel terminal portion of the upper face portion 24*d* of the blowing tunnel 24. The air is emitted from the terminal of the blowing tunnel 24 into the housing, and passes through the suction port 60 from the interior of the housing and enters the interior of the blowing tunnel 24. Thus, the air is circulated within the housing and the blowing tunnel 24.

Next, the blower 26 and the heater 28 will be explained. As shown in FIG. 6, the blower 26 and a heater substrate 70 are stored to the rear face portion 24*c* of the blowing tunnel 24.

The blower 26 is constructed by a fan and a motor. The blower 26 is approximately arranged at the center in the height direction (the blower may be also called a fan motor). The blower 26 is arranged such that its rotating axis becomes the vertical direction. Namely, the blower 26 is arranged such that the rotating face of the blower is perpendicular to the blowing tunnel 24*c*.

The heater substrate 70 is divided into upper and lower portions with the blower 26 sandwiched therebetween. The heater 28 is mounted to a lower side portion of the heater substrate 70. The heater 28 is a heater of a resistance type. The heater 28 is constructed by plural resistors arranged on the heater substrate 70. These resistors generate heat by receiving the supply of electric power.

Further, in the rear face portion 24*c* of the blowing tunnel 24, a control circuit 30, a temperature sensor 32 and an electric power source device 34 (see FIG. 1) are arranged together with the heater substrate 70, or are arranged in a state where they are mounted to the heater substrate 70. The electric power source device (circuit) supplies electric power to the blower 26 and the heater 28. A temperature detecting signal of the temperature sensor 32 is inputted to the control circuit 30. The control circuit 30 controls the electric power supply to the blower 26 and the heater 28 so that the control circuit 30 controls turning-on and turning-off of the blower 26 and the heater 28.

In addition, attachment brackets 80, 82 are arranged in the camera device 10. The attachment bracket 80 is fixed to the rear face of the camera housing 14. The attachment bracket 82 is fixed to a camera arranging portion. The attachment bracket 80 is combined with the attachment bracket 82. Thus, the camera device 10 is fixed to an arranging portion. A cord cover 84 is attached to the lower side of the camera housing 14.

Figure 11:
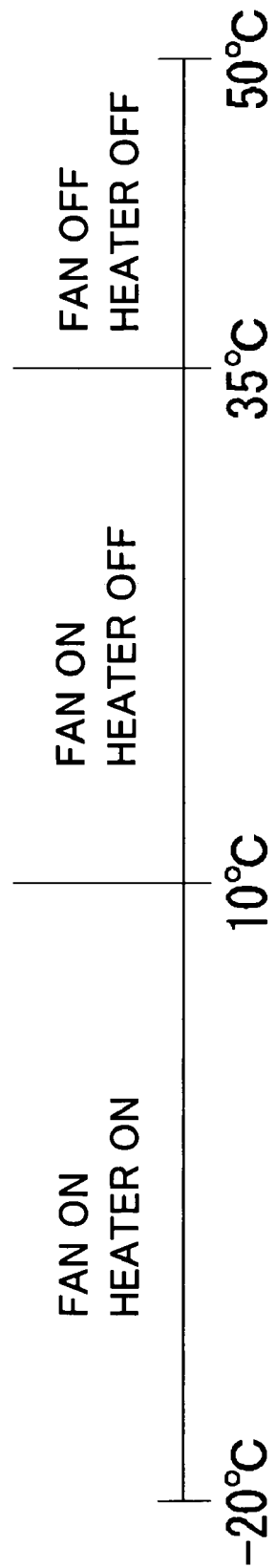
FIG. 11 is a view showing a map for controlling the operations of a blower and a heater.

FIG. 11 shows an example of control processing of the blower 26 and the heater 28 using the control circuit 30. In the example of this figure, when temperature is 35 degrees or more, both the blower 26 and the heater 28 are turned off. When temperature is 10 degrees or more and is less than 35 degrees, only the blower 26 is turned on. Further, when temperature is less than 10 degrees, both the blower 26 and the heater 28 are turned on.

Next, one example of an assembly order of the camera device 10 will be explained. With reference to FIG. 6, the dome cover 20 is attached to the front housing 40 by ultrasonic welding before the assembly. The blower 26, the heater substrate 70, etc. are attached between the tunnel wall ribs 50 and 52 of the rear housing 42. Further, the tunnel wall plate 54 is attached to the rear housing 42 by screws 56 so as to cover the space between the tunnel wall ribs 50 and 52. Thus, the rear face portion 24*c* of the blowing tunnel 24 is formed.

The camera 12 is then attached to the rear housing 42. At this time, a wall suspending tool of the rear face of the camera 12 is caught in an unillustrated hook portion of a mount. The hook portion of the mount is attached to the rear housing 42 from above the tunnel wall plate 54.

Further, the front housing 40 is combined with the rear housing 42. The front housing 40 and the rear housing 42 are fixed by screws 44. Thus, the camera 12 is nipped by the front housing 40 and the rear housing 42, and is stored into the camera housing 14.

When the camera 12 is stored into the camera housing 14, the dome cover 18 and the dome cover 20 are arranged by opening the clearance 22. Thus, the shooting window portion 16 of the double structure is formed. Further, the camera front face is close to the housing inner face. Thus, the front face portions 24*a*, 24*b* of the blowing tunnel 24 are formed between the tunnel wall portions 46, 48 and the camera front face. The lower end of the front face portion 24b is opposed to the lower end of the rear face portion 24c, and both these portions are communicated with each other. Further, a tunnel wall rib 58 above the front housing 40 is close to the upper face of the camera 12. Thus, the upper face portion 24d of the blowing tunnel 24 is formed. The upper face portion 24d is communicated with the upper end of the front face portion 24a.

Further, the cord cover 84 is attached to the lower side of the camera housing 14. Further, the attachment bracket 80 is attached to the rear face of the camera housing 14. Further, the attachment bracket 82 is attached to a camera arranging portion. The attachment bracket 80 is then attached to the attachment bracket 82. Thus, the camera 12 is attached to an arranging portion.

Next, the operation of the camera device 10 of this embodiment mode will be explained. A temperature detecting signal is supplied from the temperature sensor 32 to the control circuit 30. As shown in FIG. 11, when temperature is 35 degrees or more, the control circuit 30 stops the electric power supply to the blower 26 and the heater 28, and turns off the blower 26 and the heater 28.

When temperature is 10 degrees or more and is less than 35 degrees, the control circuit 30 supplies electric power to the blower 26, and turns on the blower 26. Thus, a wind is sent. The air for blowing is sucked from the suction port 60 arranged at the upper end of the rear face portion 24c of the blowing tunnel 24, and is lowered in the rear face portion 24c, and reaches the front face portion 24b, and further reaches the shooting window portion 16. The air flow then passes through the clearance 22 between the dome cover 20 and the dome cover 18, and again enters the blowing tunnel 24. Further, the air reaches the upper face portion 24d from the upper end of the front face portion 24a.

The upper face portion 24d of the blowing tunnel 24 is terminated in an intermediate portion of the camera upper face. The suction port 60 is located ahead of a blowing tunnel terminal portion. The blowing tunnel terminal portion and the suction port 60 are opposed to each other. Accordingly, the air passing through the blowing tunnel 24 is widened from the terminal portion into the housing. The widened air again enters the blowing tunnel 24 from the interior of the housing through the suction port 60. Thus, the air passes through the interior of the blowing tunnel 24, and is circulated within the camera housing 14.

As mentioned above, the wind is blown to the clearance 22 of the double structure of the shooting window portion 16 via the blowing tunnel 24. The dew condensation of the shooting window portion 16 can be prevented and can be eliminated for a short time by a heat insulating effect of the double structure and the effect of the air flow using the blowing. Since the air is supplied by passing through a narrow space, the flow velocity of the air is increased and high dew condensation preventing ability is obtained. Even when the dew condensation is caused, this dew condensation becomes extinct for a short time.

When temperature is less than 10 degrees, the control circuit 30 also supplies electric power to the heater 28 in addition to the blower 26. Accordingly, both the blower 26 and the heater 28 are turned on. In this case, the air sent from the blower 26 is heated when this air passes through the heater 28. Thus, a warm wind is sent to the shooting window portion 16 via the tunnel.

Thus, the dew condensation preventing ability is further increased by adding a heating effect using the warm wind in addition to the heat insulating effect of the double structure and the effect of the air flow using the blowing. Even when the dew condensation is caused, this dew condensation becomes extinct for a short time.

The camera device 10 relating to this embodiment mode of the present invention has been explained as mentioned above. In accordance with this embodiment mode, the shooting or photographing window portion 16 has the double structure, and the wind is sent to the clearance 22 of the double structure via the tunnel 24. Thus, the dew condensation preventing ability is obtained by the heat insulating effect of the double structure and the effect of the air flow using the blowing. Further, the flow velocity of the air of the shooting or photographing window portion 16 is increased by blowing the wind via the tunnel 24 so that the dew condensation preventing ability can be improved.

Further, in accordance with this embodiment mode, the blowing tunnel 24 is formed by the outer face of the camera 12 and the inner face of the camera housing 14. Thus, the blowing tunnel can be realized by a simple construction.

Further, in accordance with this embodiment mode, the blowing tunnel 24 is arranged so as to form a blowing path turning round the circumference of the camera 12. Thus, the air sent from the blower 26 is reliably sent to the shooting window portion 16. High dew condensation effect preventing ability is obtained even when the blower 26 is separated from the shooting window portion 16. The degree of freedom of position setting of the blower 26 is increased. The dew condensation preventing ability can be also further improved by circulating the air to the blowing path.

More specifically, a wind amount can be maintained even when the blower 26 is separated from the shooting window portion 16. Accordingly, it is not necessary to set the blower 26 to be large-sized. Further, as seen in the example of the arrangement to the camera rear face side in this embodiment mode, the blower 26 can be also arranged in a place hidden from the shooting window portion 16. Accordingly, it is advantageous since the arranging place of the blower 26 can be set to a place not obstructed in shooting or photographing and advantageous in view of compactness, etc. The same is true on the heater 28. Thus, in accordance with this embodiment mode, the camera device 10 can be also made compact.

Further, in accordance with this embodiment mode, a warm wind can be sent to the shooting window portion 16 by arranging the heater 28 for heating the air supplied to the shooting window portion 16. The dew condensation preventing ability can be improved by the heating effect of the warm wind.

Further, in accordance with this embodiment mode, electric power consumption can be restrained since the operations of the blower 26 and the heater 28 are controlled in accordance with temperature.

Further, in accordance with this embodiment mode, the dew condensation of the dome cover in the camera device with the dome cover can be prevented.

Further, in accordance with this embodiment mode, since the dew condensation preventing ability can be improved, the blower 26 can be made compact and the heater 28 can be also made compact.

Further, in accordance with this embodiment mode, a suitable camera housing 14 able to improve the dew condensation preventing ability by practically using a chassis of the camera 12 as mentioned above can be provided.

The present invention is not limited to the above embodiment modes, but the above embodiment modes can be modified within the scope of the present invention by persons skilled in the art. For example, the blower and the heater may be arranged on the upper face of the housing, and the air may be also sent from the upper side to the shooting window portion via the tunnel. The two tunnel wall ribs 58 may be also started from the front end of the upper face, and may be extended until the vicinity of the suction port 60, and the upper face portion 24d of the blowing tunnel 24 may be also terminated in the vicinity of the suction port 60.

EXPERIMENT EXAMPLE 1

An experimental result of the dew condensation preventing ability using the above camera device 10 will next be explained. In the experiment, the camera device was held for 30 minutes in a low temperature chamber of −20 degrees. Then, the blower and the heater were turned on within the low temperature chamber. Next, the camera device was taken out of the low temperature chamber, and was arranged in an environment of the external air (about 25 degrees). Dew condensation was generated by making such a sudden temperature difference. Then, time taken to restore from the dew condensation was measured. Here, the passing time from a time point for taking the camera device out of the low temperature chamber to the extinction of the dew condensation was measured.

In the result of the experiment, the camera device was restored from the dew condensation after the passage of about one minute, i.e., the dew condensation became extinct.

As a comparison example, the same experiment was made by using the conventional camera device. In this case, it took about four minutes to restore the camera device from the dew condensation.

EXPERIMENT EXAMPLE 2

The same experiment as the above embodiment 1 was made. In this case, the camera device was taken out of the low temperature chamber, and the blower and the heater were turned on after the dew condensation was confirmed.

In this case, the camera device was restored from the dew condensation when about two minutes and ten seconds passed.

As mentioned above, the camera device in the present invention has the effect of being able to improve the dew condensation preventing ability, and is useful as a monitor camera device, for the outdoors, etc.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. A camera device comprising a camera, a camera housing for covering said camera, and a blowing section, wherein said camera and said camera housing form a shooting window portion of a double structure with the two structures overlaying each other having a clearance in between, and a blowing tunnel communicated with the clearance of said shooting window portion is arranged on each of both sides of said shooting window portion, and said blowing section sends a wind to said shooting window portion through said blowing tunnel, wherein said camera and said camera housing have a camera dome cover and a housing dome cover, respectively with said two dome covers overlying each other, wherein said camera housing has a front face to which said housing dome cover is attached, and said front face comprises a tunnel wall portion formed on each of the upper and lower sides of said shooting window portion, and wherein said tunnel wall portion is located in part in the transverse direction, and the surface of said tunnel wall portion is projected outside from the surface of the remaining portion of said front face which is close to the outer surface of said camera.

2. The camera device according to claim 1, wherein said blowing tunnel is formed by the outer face of said camera and the inner face of said camera housing.

3. The camera device according to claim 1, wherein said blowing tunnel is arranged so as to form a blowing path around the circumference of said camera.

4. The camera device according to claim 1, wherein the camera device further comprises a heater for heating the air supplied to said shooting window portion.

5. The camera device according to claim 4, wherein the camera device further comprises a temperature detecting section, and a control section for controlling the operations of said blowing section and said heater in accordance with temperature detected by said temperature detecting section.

6. The camera device according to claim 1, wherein in said tunnel wall portion, a concave portion is arranged on the inner face of said camera housing, and wherein said concave portion and the outer face of said camera form the front face portions of said blowing tunnel, wherein said housing dome cover is sandwiched between said front face portions.

7. The camera device according to claim 6, wherein the depth of said concave portion of said tunnel wall portion is set to be approximately equal to the distance of the clearance between said camera dome cover and said housing dome cover, and wherein the width of said concave portion of said tunnel wall portion is set to be approximately equal to the diameter of said camera dome cover and said housing dome cover.

8. A camera housing constructed so as to cover a camera and comprising:

a window member of the camera housing side for forming a shooting window portion of a double structure with the two structures overlaying each other having a clearance in between;

a tunnel wall portion for forming a blowing tunnel communicated with the clearance of said shooting window portion on each of the upper and lower sides of said shooting window portion; and a blowing section for sending a wind to said shooting window portion through said blowing tunnel, wherein said tunnel wall portion is formed on each of the upper and lower sides of said shooting window portion, wherein said camera housing has a housing dome cover and a front face to which said housing dome cover is attached, and said front face comprises said tunnel wall portion, and wherein said tunnel wall portion is located in part in the transverse direction, and the surface of said tunnel wall portion is projected outside from the surface of the remaining portion of said front face which is close to the outer surface of said camera.

9. The camera housing according to claim 8, wherein in said tunnel wall portion, a concave portion is arranged on the inner face of said camera housing, and wherein said concave portion and the outer face of said camera form the front face portions of said blowing tunnel, wherein said housing dome cover is sandwiched between said front face portions.

10. The camera housing according to claim 9, wherein said camera has a camera dome cover, said camera dome cover and said housing dome cover overlying each other, wherein the depth of said concave portion of said tunnel wall portion is set to be approximately equal to the distance of the clearance between said camera dome cover and said housing dome cover, and wherein the width of said concave portion of said tunnel wall portion is set to be approximately equal to the diameter of said camera dome cover and said housing dome cover.

* * * * *